(12) United States Patent
Himmelberg

(10) Patent No.: US 7,350,738 B1
(45) Date of Patent: *Apr. 1, 2008

(54) SOD UNROLLING MACHINE

(76) Inventor: Wayne F. Himmelberg, 1695 S. Wabash, Hastings, NE (US) 68901

( * ) Notice: Subject to any disclaimer, the term of this patent is extended or adjusted under 35 U.S.C. 154(b) by 450 days.

This patent is subject to a terminal disclaimer.

(21) Appl. No.: 11/211,924

(22) Filed: Aug. 25, 2005

(51) Int. Cl.
 *B65H 23/06* (2006.01)
(52) U.S. Cl. .................................... 242/422.5; 242/557
(58) Field of Classification Search ............ 242/422.4, 242/422.5, 403, 557, 919; 172/19, 20; 414/911, 414/920; 111/901, 902
See application file for complete search history.

(56) References Cited

U.S. PATENT DOCUMENTS

| 3,632,054 | A | 1/1972 | Heppelmann et al. | |
|---|---|---|---|---|
| 4,754,815 | A | 7/1988 | Brouwer et al. | 172/2 |
| 4,878,542 | A | 11/1989 | Brouwer et al. | 172/1 |
| 4,890,801 | A | 1/1990 | Brouwer et al. | |
| 5,215,278 | A | 6/1993 | Hess | |
| 5,307,880 | A | 5/1994 | Woerner | 172/19 |
| 5,437,528 | A | 8/1995 | Decker | 414/24.6 |
| 5,509,770 | A | 4/1996 | Burenga | 414/24.6 |
| 5,697,452 | A | 12/1997 | Link | 172/19 |
| 5,988,289 | A | 11/1999 | Holland et al. | 172/20 |
| 6,131,668 | A | 10/2000 | Houska | 172/253 |
| 6,179,060 | B1 | 1/2001 | Halter | 179/19 |
| 6,213,218 | B1 | 4/2001 | Miller | 179/19 |
| 6,550,406 | B2 | 4/2003 | Bass et al. | 111/100 |
| 6,595,455 | B2 * | 7/2003 | Romes | 242/422.5 |
| 2003/0136565 | A1 * | 7/2003 | Peterson | 172/20 |
| 2005/0167540 | A1 * | 8/2005 | Keeven | 242/557 |

* cited by examiner

*Primary Examiner*—William A Rivera
(74) *Attorney, Agent, or Firm*—Dennis L. Thomte; Thomte Law Office LLC

(57) ABSTRACT

A sod unrolling machine including a frame which is adapted to be secured to the rear end of a vehicle having a vertically movable hitch. The frame includes first and second horizontally spaced-apart and rearwardly extending frame members with each of the first and second frame members having a rearward end. A sod roll support is rotatably secured to the rearward ends of the first and second frame members and extends therebetween for supporting a sod roll thereon. A sod roll brake is movably secured to the frame and is movable between first and second positions. When the sod brake is in its first position, the brake is not in engagement with the sod roll. When the sod roll brake is in its second position, the sod roll brake engages the sod roll, to prevent the sod from unrolling from the sod roll.

12 Claims, 3 Drawing Sheets

SOD UNROLLING MACHINE

BACKGROUND OF THE INVENTION

1. Field of the Invention

This invention relates to a sod unrolling machine and more particularly to a sod unrolling machine including a sod roll brake which prevents the sod from unrolling from the sod roll when it is in engagement with the sod roll.

2. Description of the Related Art

In recent years, sod has been rolled into very large sod rolls. The weight of the sod rolls is such that machines are required to transport the sod rolls from a transport truck to the area where the sod is to be laid. Sometimes the sod roll, when being moved from the transport truck to the area to be sodded, will inadvertently unroll which creates a problem for the sod laying personnel. Further, when the roll of sod is being unrolled onto the ground, the sod tends to slough off creating irregular surfaces or bumps in the installed sod. At present, it is believed that none of the prior art sod unrolling machines have any means to prevent the inadvertent unrolling of the sod or any means which eliminates the problem of the sod sloughing off from the sod roll during the actual sod unrolling procedure.

SUMMARY OF THE INVENTION

A sod unrolling machine including a frame means which is adapted to be secured to the rear end of a vehicle, such as a tractor or the like, having a vertically movable hitch, such as a two or three point hitch. The frame means includes first and second, horizontally spaced-apart, rearwardly extending frame members with each of the first and second frame members having a rearward end. A sod roll support is rotatably secured to the rearward ends of the first and second frame members and extends therebetween for supporting a sod roll thereon. A sod roll brake is movably secured to the frame means which is movable between first and second positions. The sod roll brake is out of engagement with the sod roll, when in its said first position, to permit the sod to unroll from the sod roll. The sod roll brake engages the sod roll, when in its second position, to prevent the sod from unrolling from the sod roll.

In the preferred embodiment, the sod roll brake is manually movable between its first and second positions. The sod roll brake includes at least one spike, and preferably several spikes, which are driven into the sod roll when the sod roll brake is moved to its second position. The frame means includes a locking device which selectively locks the sod roll brake in its first position.

It is therefore a principal object of the invention to provide an improved sod unrolling machine.

Still another object of the invention is to provide a sod unrolling machine which includes a brake adapted to engage the sod roll to prevent the sod from unrolling from the sod roll.

A further object of the invention is to provide a sod unrolling machine which is easily operated.

Still another object of the invention is to provide a sod unrolling machine which may be secured to a two or three point hitch of a vehicle such as a tractor or the like.

These and other objects will be apparent to those skilled in the art.

DETAILED DESCRIPTION OF THE INVENTION

Figure 1:
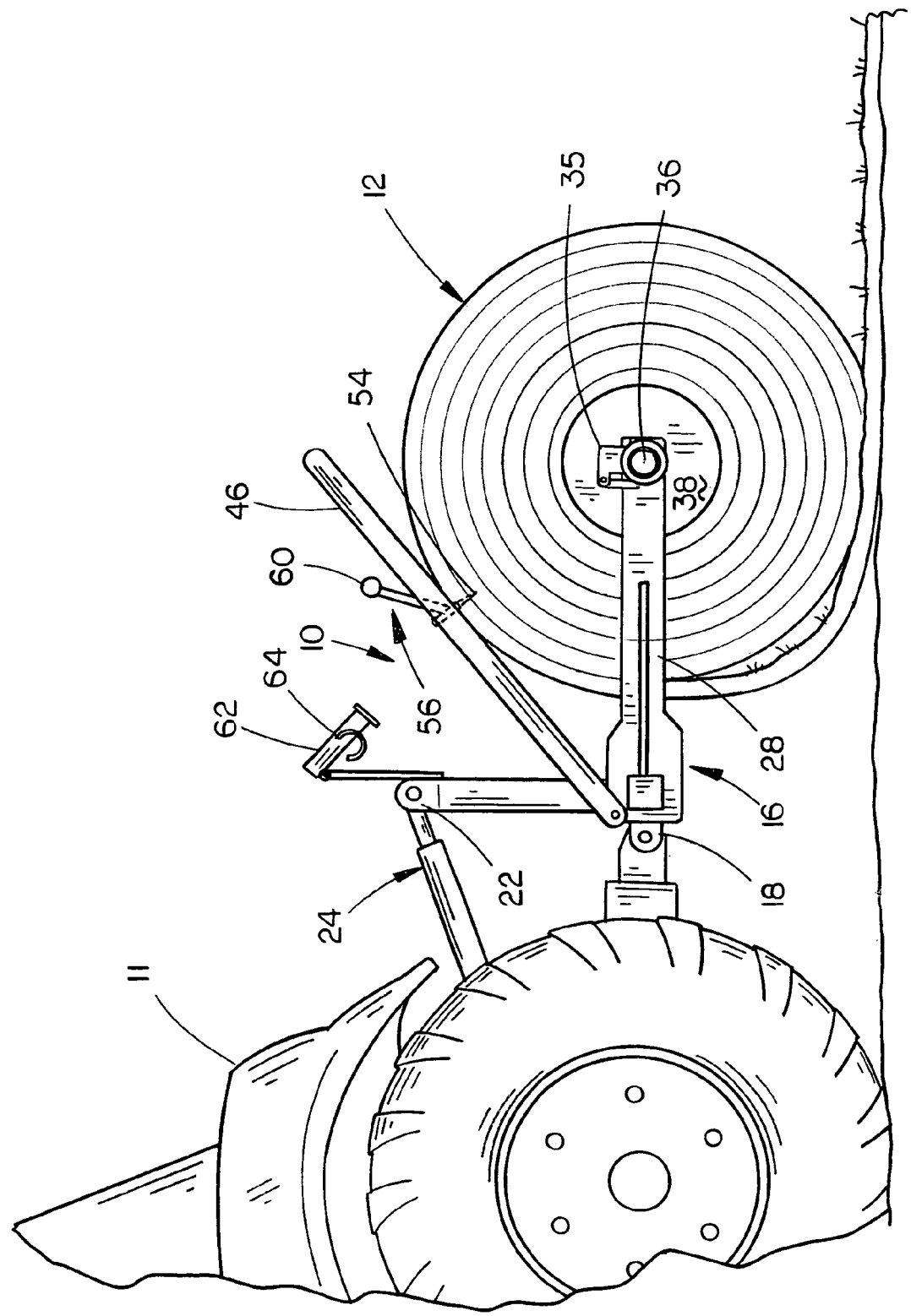
FIG. 1 is a side view of the sod unrolling machine of this invention.

The numeral 10 refers to the sod unrolling machine of this invention which is preferably mounted at the rear of a vehicle 11 such as a tractor, ATV, etc., although the machine could possibly be mounted at the front of the vehicle providing some sort of lift mechanism is provided at the front of the vehicle. If the machine is mounted on the forward end of the vehicle, the machine must be driven rearwardly during the sod unrolling operation to prevent the vehicle from driving upon the newly laid sod. The numeral 12 refers to a conventional large roll of sod or sod roll. Normally, the sod is rolled around a tube 14 to form the sod roll.

Machine 10 includes a frame means 16 having at least two and preferably three hitch points 18, 20 and 22 which are secured to the three-point hitch 24 at the rear of the vehicle 11. Hitch 24 is vertically movable by the vehicle operator to raise and lower the frame means 16. Frame means 16 includes a transversely extending frame member 26 having opposite ends. Elongated arms 28 and 30 extend rearwardly from the opposite ends of frame member 26 in a horizontally spaced-apart manner. The rearward ends of arms 28 and 30 are provided with U-shaped slots or openings 32 and 34 formed therein, respectively, which are adapted to receive the collars 42 and 44 mounted on opposite ends of shaft 36 therein. Pivotal locks 35 and 37 are adapted to maintain collars 42, 44 and shaft 36 in slots 32 and 34, respectively. Discs 38 and 40 are mounted on shaft 36 inwardly of the collars 42 and 44, respectively, inwardly of the U-shaped openings or slots 32 and 34, respectively, and are provided with hubs H which are adapted to be received by the open ends of tube 14. The tubular portions of collars 42 and 44 are rotatably received by the slots 32 and 34, respectively, and have bearings or bushings mounted therein which embrace shaft 36. Locking retainer 43 is secured to one end of shaft 36 outwardly of collar 44. Cotter key or pin 45 extends through sleeve S and shaft 36, as seen in the drawings.

Figure 3:
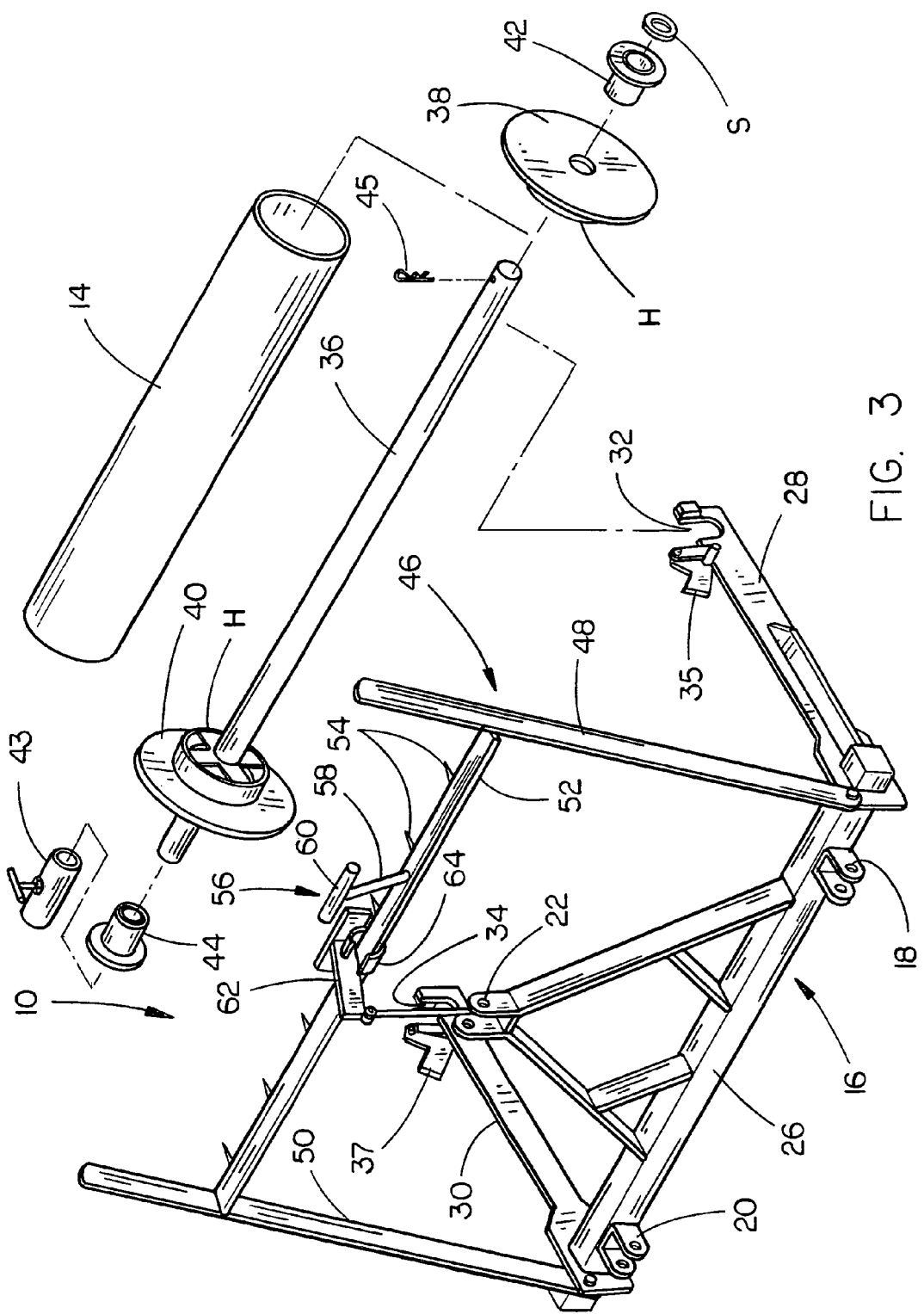
FIG. 3 is an exploded perspective view of the sod unrolling machine of this invention.

The numeral 46 refers to the sod roll brake of this invention. Brake 46 includes a pair of elongated arms 48 and 50 which are pivoted at their forward ends to the frame member 26, as seen in FIG. 3. A support 52 is secured to and extends between arms 48 and 50, as seen in FIG. 3. A plurality of elongated spikes or spears 54 are secured to support 52 and extend therefrom for engagement with the sod roll 12 as will be explained hereinafter. A T-shaped handle 56 is secured to support 52 and includes handle portions 58 and 60.

The numeral 62 refers to a locking device pivotally mounted on frame means 16. Locking device 62 includes a C-shaped member 64 adapted to receive support 52 therein to maintain the brake 46 in its stowed or inoperative position, as seen in FIG. 3. When locking device 62 is pivotally moved upwardly to release or free support 52 from the C-shaped member 64, either of the arms 48 and 50 of the handle 56 may be grasped so that the brake may be moved to its sod roll engaging position of FIG. 1. When in its sod roll engaging position of FIG. 1, the spikes 54 pierce the sod roll to prevent the sod roll from unrolling. When the spikes 54 are not in engagement with the sod roll, the sod may be unrolled therefrom. Shaft 36 is extended through the tubular hub 14 positioned within the sod roll, with the discs 38 and 40 being positioned at the opposite sides of the sod roll 12. The vehicle is then maneuvered with respect to the sod roll so that the arms 28 and 30 are positioned at opposite sides of the sod roll beneath the ends of shaft 36. The frame means 16 is then raised so that the U-shaped openings 32 and 34 receive the shaft 36. The locks 35 and 37 are then closed.

Figure 2:
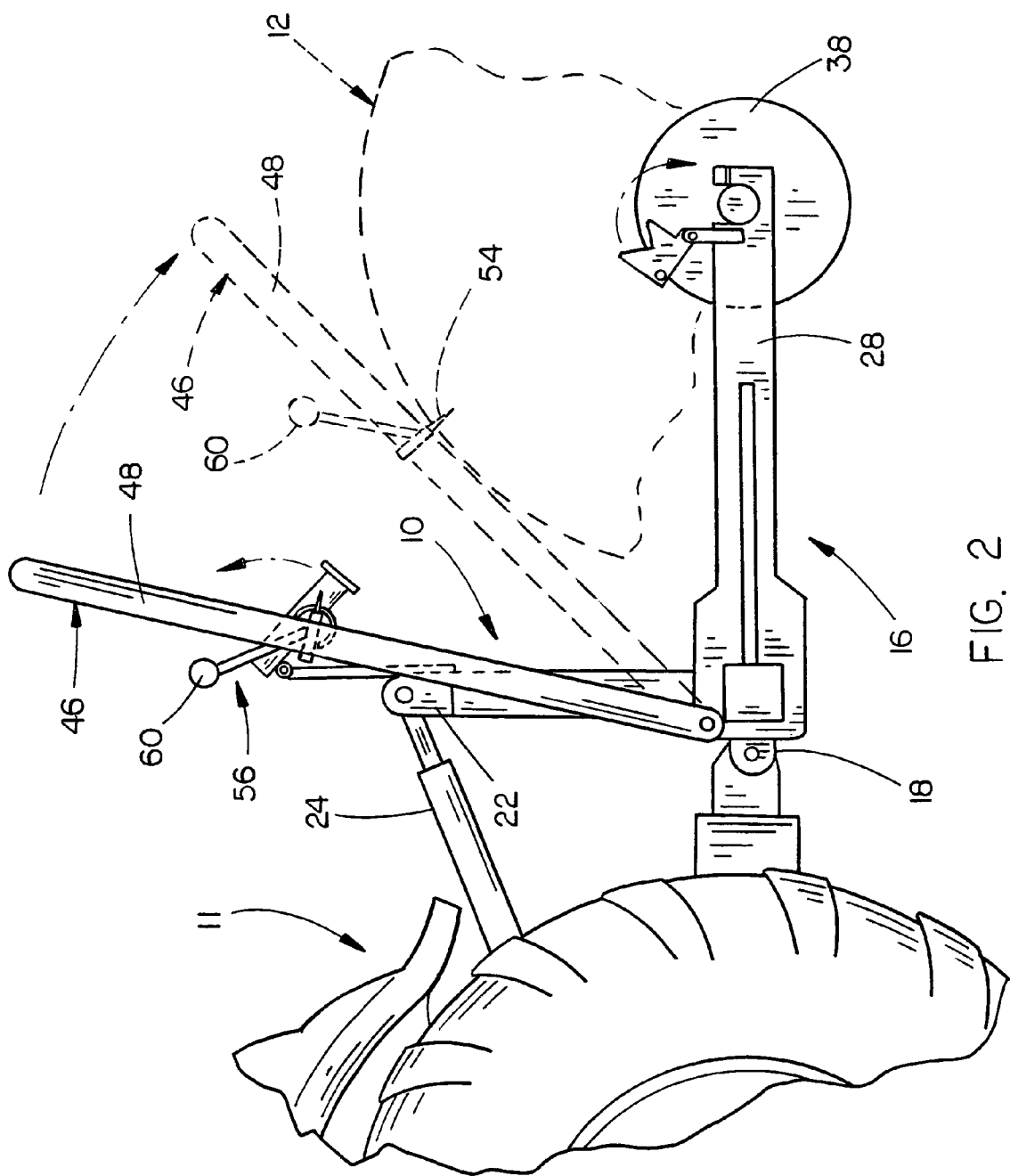
FIG. 2 is a side view of the sod unrolling machine of this invention with the sod roll brake being in its inoperative position with the broken lines illustrating the sod roll brake in its sod roll braking position.

The sod roll brake 46 is then moved to the position illustrated in FIG. 1 so that the spikes 54 are driven into the sod roll to prevent the sod roll from unrolling during the time that the sod roll 12 is moved from the truck to the area in which the roll is to be unrolled. When the vehicle 11 is properly positioned and the roll of sod has been lowered into ground engagement, the brake 46 is pivotally moved to its inoperative position illustrated by solid lines in FIG. 2 so that as the tractor 11 moves forwardly, the roll of sod will be unrolled, as illustrated in FIG. 1. Should the sod slough off from the roll 12, the brake 46 will be engaged, as illustrated in FIG. 1, and the sod roll will be raised somewhat, so that the vehicle 11 may be moved forwardly without unrolling additional sod. When the sloughed off portion of the sod roll 12 has been stretched and laid onto the ground, the sod roll will be lowered into ground engagement and the brake 46 will then be moved to its inoperative or stored position so that the sod roll may continue to be unrolled as the vehicle moves forwardly.

It can therefore be seen that the sod unrolling machine of this invention prevents the sod from unrolling from the sod roll while the sod roll is being transported from the transport truck to the area which the sod roll will be unrolled. Further, during the time that the sod roll 12 is being unrolled, the brake 46 may be engaged so that any sloughing off portion of the sod roll may be tightened or stretched by movement of the vehicle forwardly without further unrolling of the sod from the roll 12, as set forth above.

Thus it can be seen that the invention accomplishes at least all of its stated objectives.

I claim:

1. A sod unrolling machine, comprising:
   a frame means adapted to be secured to the rear end of a vehicle having a vertically movable hitch;
   said frame means including first and second, horizontally spaced-apart frame members extending rearwardly therefrom;
   each of said first and second frame members having a rearward end;
   a sod roll support rotatably secured to said rearward ends of said first and second frame members and extending therebetween for supporting a sod roll thereon;
   a sod roll brake movably secured to said frame means which is movable between first and second positions;
   said sod roll brake being out of engagement with the sod roll, when in its said first position, to permit the sod to unroll from the sod roll;
   said sod roll brake engaging the sod roll, when in its said second position, to prevent the sod from unrolling from the sod roll.

2. The machine of claim 1 wherein said sod roll brake is manually movable between its said first and second positions.

3. The machine of claim 1 wherein said sod roll brake includes at least one spike which is driven into the sod roll when said sod roll brake is moved to its said second position.

4. The machine of claim 1 wherein said sod roll brake includes a plurality of spaced-apart spikes which are driven into the sod roll when said sod roll brake is moved to its said second position.

5. The machine of claim 1 wherein said frame means includes a locking device which selectively locks said sod roll brake in its said first position.

6. The machine of claim 1 wherein sod roll brake comprises first and second, elongated, horizontally spaced-apart arms having first and second ends and an elongated support secured to and extending between said first and second arms, said first ends of said first and second arms being pivotally secured to said frame means, and at least one spike secured to said elongated support adapted to be driven into said sod roll when said sod roll brake is moved to its said second position.

7. The machine of claim 6 wherein a locking device is provided on said frame means which selectively locks said sod roll brake in its said first position.

8. The machine of claim 1 wherein sod roll brake comprises first and second, elongated, horizontally spaced-apart arms having first and second ends and an elongated support secured to and extending between said first and second arms, said first ends of said first and second arms being pivotally secured to said frame means, and a plurality of horizontally spaced-apart spikes secured to said elongated support adapted to be driven into said sod roll when said sod roll brake is moved to its said second position.

9. The machine of claim 8 wherein a handle is secured to said elongated support for grasping when said sod roll brake is being moved between its said first and second positions.

10. The machine of claim 9 wherein said handle is T-shaped.

11. The machine of claim 10 wherein a locking device is provided on said frame means which engages said elongated support, when said sod roll brake is in its said first position, to lock said sod roll brake in its said first position.

12. The machine of claim 1 wherein a handle is secured to said sod roll brake for grasping when said sod roll brake is being moved between its said first and second positions.

\* \* \* \* \*